US009361435B1

(12) United States Patent
Koka (10) Patent No.: US 9,361,435 B1
(45) Date of Patent: Jun. 7, 2016

(54) MULTI-TIER DIGITAL SUPPLY CHAIN MANAGEMENT

(71) Applicant: FLEXERA SOFTWARE LLC, Itasca, IL (US)

(72) Inventor: Vikram Koka, Fremont, CA (US)

(73) Assignee: FLEXERA SOFTWARE LLC, Itasca, IL (US)

( * ) Notice: Subject to any disclaimer, the term of this patent is extended or adjusted under 35 U.S.C. 154(b) by 0 days.

(21) Appl. No.: 14/597,150

(22) Filed: Jan. 14, 2015

(51) Int. Cl.
*G06F 21/10* (2013.01)
*H04L 9/32* (2006.01)
*G06Q 50/18* (2012.01)

(52) U.S. Cl.
CPC .............. *G06F 21/105* (2013.01); *G06F 21/10* (2013.01); *H04L 9/3265* (2013.01); *G06F 2221/0704* (2013.01); *G06Q 50/184* (2013.01)

(58) Field of Classification Search
CPC ...... G06F 21/10; G06F 21/105; H04L 9/3265
See application file for complete search history.

(56) References Cited

U.S. PATENT DOCUMENTS

| | | | | |
|---|---|---|---|---|
| 7,716,348 | B1* | 5/2010 | Redding | G06F 21/10 705/59 |
| 8,041,642 | B2* | 10/2011 | Lenard | G06F 21/105 705/59 |
| 9,135,778 | B2* | 9/2015 | Patel | G07F 17/323 |
| 2003/0220880 | A1* | 11/2003 | Lao et al. | 705/51 |
| 2004/0039916 | A1* | 2/2004 | Aldis et al. | 713/177 |
| 2004/0193545 | A1* | 9/2004 | Shlasky | G06F 21/125 705/59 |
| 2004/0220878 | A1* | 11/2004 | Lao et al. | 705/51 |
| 2005/0102240 | A1* | 5/2005 | Misra | G06Q 30/06 705/59 |
| 2006/0253400 | A1* | 11/2006 | Okamoto | G06Q 30/06 705/57 |
| 2006/0265337 | A1* | 11/2006 | Wesinger, Jr. | 705/65 |
| 2007/0043679 | A1* | 2/2007 | Le et al. | 705/59 |
| 2007/0067630 | A1* | 3/2007 | Lenkov et al. | 713/168 |
| 2008/0243699 | A1* | 10/2008 | Hilerio et al. | 705/59 |
| 2009/0124374 | A1* | 5/2009 | Patel | G07F 17/32 463/29 |
| 2009/0124375 | A1* | 5/2009 | Patel | G07F 17/323 463/29 |
| 2009/0299791 | A1* | 12/2009 | Blake | G06Q 10/06 705/40 |
| 2012/0297487 | A1* | 11/2012 | Xia | G06F 21/10 726/24 |
| 2014/0337924 | A1* | 11/2014 | Smith et al. | 726/4 |

(Continued)

OTHER PUBLICATIONS

Liu, Zonghua; Wang, Bohyun; Lee, Byungwook; Han, Myung-Mook; "Security License Distribution Mechanism for Rights Delegation Models of Group Distribution between Consumers", International Conference on Computational Science and its Applications, Aug. 26-29, 2007, IEEE, pp. 144-152.*

(Continued)

*Primary Examiner* — Victor Lesniewski
(74) *Attorney, Agent, or Firm* — Perkins Coie LLP (57) ABSTRACT

Several embodiments enable management of a bulk package of licenses at a distribution server. The distribution server can store a fulfillment record of a set of licenses. The fulfillment record can indicate distribution statuses of the licenses. The distribution server can also maintain a distribution hierarchy for the set of licenses in the distribution server. The distribution hierarchy can identify one or more other distribution servers that transferred the set of licenses from a root of trust for the licenses to the distribution server and one or more end-user devices or distribution servers that received or fulfilled at least one of the licenses from that the distribution server. When the distribution server distributes a subset of the licenses to a target computing device, the distribution server can update both the fulfillment record and the distribution hierarchy.

18 Claims, 7 Drawing Sheets

(56) References Cited

U.S. PATENT DOCUMENTS

2014/0379594 A1* 12/2014 Alongi .................. G06Q 30/01
705/318
2014/0379595 A1* 12/2014 Slattery ................. G06F 21/10
705/318

OTHER PUBLICATIONS

Sharifi, Mohsen; Lajevardi, Behzad; Gholami, Omid; "SLDRM: A Self Local License Digital Rights Management System", International Conference on Digital Ecosystems and Technologies, Feb. 26-29, 2008, IEEE, pp. 369-374.*

* cited by examiner

MULTI-TIER DIGITAL SUPPLY CHAIN MANAGEMENT

RELATED FIELD

This disclosure relates generally to a digital supply chain management system, and in particular to a license management system.

BACKGROUND

Digital supply chain management, such as digital rights management, faces some unique challenges. For example, digital rights management can include transactions of digital rights relating to device functionality and capability usages (e.g., application module usage or hardware module usage) and electronic services. The digital rights can grant a specific use of an application, a device, or a service enabling participation or engagement in a digital activity on a computing device. In these cases, the sellers of the transactions are publishers, who control and/or restrict access to the application modules, the hardware modules, and/or the services. What is being sold in a transaction of digital right can be referred to as a "license." For example, the license can be embodied as a digital string used to verify grant of the digital rights and unlock certain functionalities protected by a device kernel.

Conventional digital rights management utilizes a centralized manager system controlled by a vendor/publisher of the licenses to communicate with any device that uses the license. In turn, each of these devices implements a control kernel that restricts access to its one or more of applications, services, or functionalities unless a verifiable license indicating a relevant digital right is presented to the control kernel. The publisher of the applications, services, or functionalities can sell and distribute licenses directly or indirectly to customers. The licenses can then serve as keys to the usage of the applications, services, or functionalities. The control kernels can validate the key periodically with the centralized manager system.

An enterprise customer can have a license server that stores licenses in a trusted storage (TS), where each license can grant a computing device some form of digital access. Because licenses in the trusted storage are valuable, the enterprise customer must back up data in the TS periodically to ensure that in case of a catastrophic failure of the computing device, the licenses are not lost forever. However, the enterprise customers cannot always return the computing device to a state before the failure has occurred. Even in the situation where the enterprise does restore the TS from backup, if the failed computing device is not brought back in a form which is identical to its prior configuration, the issuers of the licenses still cannot trust the revised TS absent some form of intervention. This dilemma impairs the robustness of the license management system, causing either the issuers of the licenses to take risk in trusting the recovered computing device or the customers to take risk in possibly losing purchased licenses in the event of device failures. Thus, the conventional architecture for a license management system cannot always be trusted during device failure events.

SUMMARY

Disclosed is a digital supply chain management system for managing electronic records of an inventory across multiple tiers of inventory management nodes. For example, the inventory can include licenses, other form of digital rights certificate or access granting keys, regenerative product or services (e.g., virtual items, service subscriptions, pay-per-use contracts), passwords and cryptographic parameters, digital financial instruments, or any combination thereof (collectively, the "digital inventory assets"). In some embodiments, the inventory can also include rentals, real estate space, physical goods (collectively, the "physical inventory assets"). In these embodiments, the digital supply chain management system can maintain the electronic records of the physical inventory assets by issuing verifiable digital representations of these assets. While many types of inventory assets are contemplated in this disclosure, this disclosure uses the inventory management of digital inventory assets, and particularly licenses, to exemplify how the digital supply chain management system can be used.

The disclosed digital supply chain management system can manage license rights by distributing verifiable "licenses" to end-user devices. The end-user devices can verify a license against one of multiple inventory management nodes in a hierarchy to fulfill the license. In some embodiments, the disclosed system provides a flexible model of license deployment (e.g., planned deployment or dynamic license deployment) that does not rely on "binding" license rights to the physical characteristics of a machine or relying on storing "hidden" information on the machine. The inventory management nodes can include a publisher/vendor license server or local license servers. Verification of each license can be chained, where verification transactions occur between inventory management nodes in neighboring tiers of the hierarchy until a "root of trust" is reached. The "root of trust" can be a device serving as a final authority that authenticates every fulfillment records of the digital inventory assets managed by the inventory management nodes. This "server based verification" can be configurable (e.g., configuring frequency of verification) based on the value of the license right and the trust level of the licensee.

The disclosed architecture for managing electronic inventory records enables improved security in situations when a computing device storing a trusted storage containing digital inventory assets (e.g., licenses) experiences a catastrophic failure. The disclosed architecture achieves the improved security by storing electronic inventory records in a trusted storage. The trusted storage can include a distribution hierarchy (e.g., upstream supply chain and downstream distribution hierarchy) and fulfillment records (e.g., end-user assignments, batch license delivery receipts, or overall balanced accounting of the digital inventory assets). Each of the inventory management nodes can have a trusted storage. That is, the disclosed architecture enables multiple tiers of consumer computing devices that both distribute and verify the digital inventory assets amongst each other and maintain a balanced accounting of the electronic records along each distribution chain and each sub-hierarchy. Each inventory management node serves as a safeguard against catastrophic failure of other management nodes. Some of the inventory management nodes can be interconnected via one or more local networks without a persistent Internet connection to the "root of trust."

Because of the multiple tiers, the disclosed architecture also improves consistency and transparency in logistic operations involving a complex and diverse organizational structure. That is, the organizational structure allows for a hierarchy amongst multiple distribution points (e.g., via the consumer computing devices) as well as participation of channel partners (e.g., distribution partner or service providers). Each distribution point can manage and rebalance the distribution of the inventory. In turn, this enables and promotes a finer level of transferability in the economy of the digital inventory assets. For example, the disclosed architecture enables multiple levels of consumer license servers that can use a license, grant and verify a license to an end-user device, or distribute a bulk package of licenses to a subsidiary license server. These local operations can all be accomplished within a local network without the necessity to contact the root of trust over a global network, such as the Internet.

A publisher may have a vested interest in managing transactions of electronic fulfillment records while ensuring that any distribution of the digital inventory assets are accounted for without tampering, replication, or error. A customer, on the other hand, may have a vested interest in having a certain amount of freedom to manage the digital inventory assets that it has acquired without needing to check for permission with the publisher for local distributions of such acquired assets. The disclosed architecture enables a way to manage electronic inventory records at multiple local distribution points of the customer while maintaining an error-free and tamper-free accounting and enabling recovery of the electronic inventory records during failure scenarios.

The disclosed architecture achieves at least the above advantages by maintaining an electronic inventory record (e.g., fulfillment record) in every trusted storage of the every management nodes in relation to a distribution hierarchy in the perspective of the particular management node. The management nodes can be distribution servers (e.g., a license servers). The management nodes can communicate with each other via one or more local networks that only has occasional access to a global network, e.g., the Internet.

A further advantage of the disclosed architecture is the self-sufficiency of a local network of the management nodes. In the absence of a network connection with other management nodes, licenses can still be distributed and validated within any local network of the management nodes. This is particularly useful in situations such as manufacturing facilities with limited Internet access, highly secured facilities with limited external data access (e.g., intelligence agencies or confidential data centers), and sites where network is provided only upon request (e.g., systems relying on cellular networks, dial-up networks, satellite networks, or microwave networks).

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A "license" here refers to a digital permit from a trusted authority granting a right to use an application or service via a computing device or to allow a digital activity to take place on a computing device. The license may be embodied as one or more digital strings used to verify grant of the digital right. A license can dictate who can use the application or service and how the application or service can be used (e.g., what functions or capabilities are available to the licensee and/or how many times the licensee can use the functions or capabilities). A license can have the attributes of whether the digital right is transferable (e.g., whether the buyer of the license can grant all rights associated with the license to another entity), modifiable (e.g., enabling a licensee to change portions of who and how the application or service can be used), movable (e.g., whether the license applied to a first computing device can be change to a second computing device), or replicable (e.g., whether the licensee has a limited right to create another instance of the license).

A "trusted authority" or a "root of trust" herein refers to an entity that intends to control digital activities and/or usage of an application or service on external computing devices via digital means. For example, the trusted authority asserts control over at least a portion of the application, the service, or the activity via an embedded mechanism in a program (i.e., executable code operable when executed by a processor).

A "trusted storage" herein refers to a secure storage of data including information regarding the identity of a device and what rights have been issued to the device. In the case that these trusted storage for a distribution server, the rights can include rights to distribute licenses and to verify fulfillment of licenses.

Figure 1:
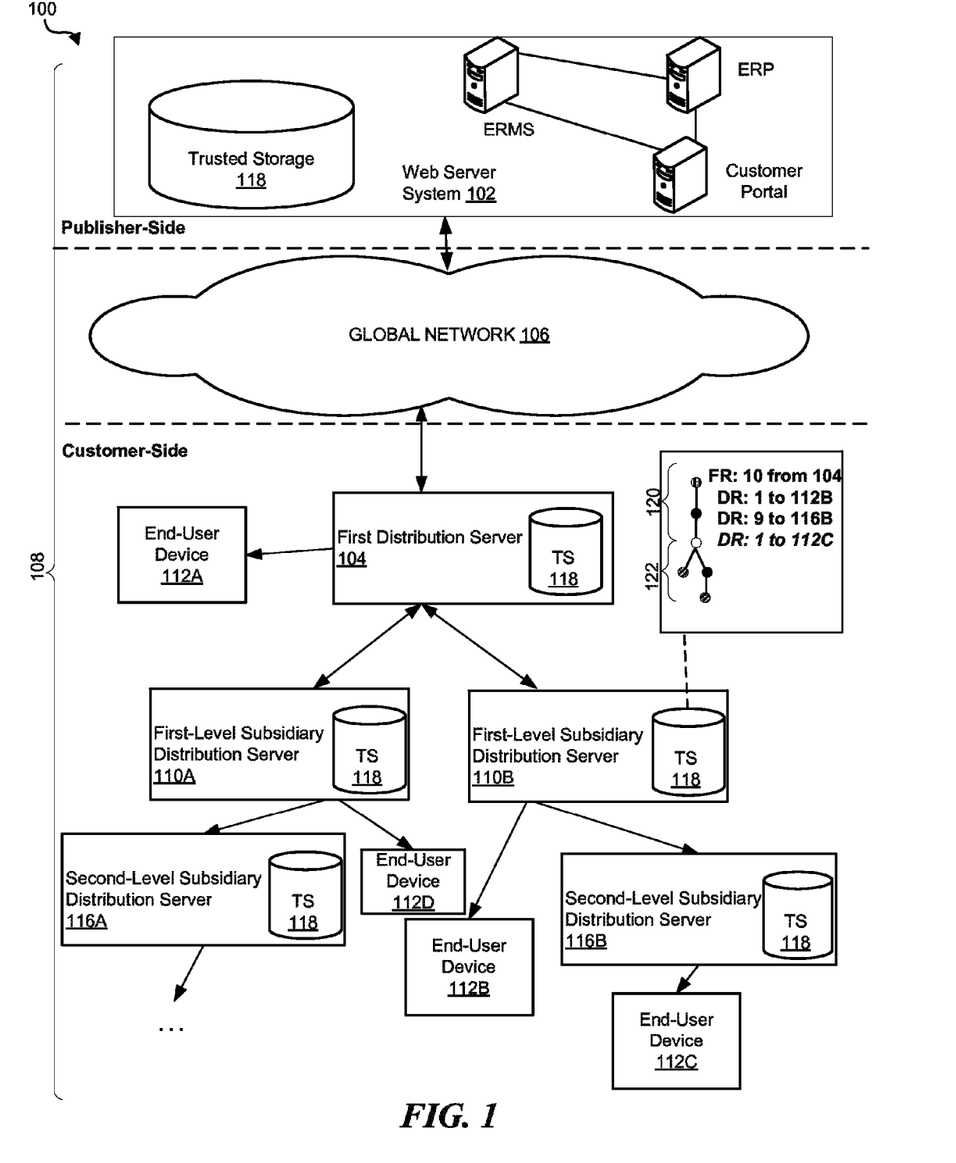
FIG. 1 is a block diagram illustrating an example of a multi-tier digital supply chain management system, in accordance with various embodiments.

FIG. 1 is a block diagram illustrating an example of a multi-tier digital supply chain management system 100, in accordance with various embodiments. The multi-tier digital supply chain management system 100 can be a digital rights management system for an inventory of licenses. The servers and devices described in FIG. 1 can be implemented as instances of the computer system 700 of FIG. 7. While the multi-tier digital supply chain management system 100 can manage an inventory of other digital assets, licenses are used below to exemplify how distribution of such digital assets can be managed.

A web server system 102 for a publisher (e.g., a vendor or an issuer) of licenses can distribute bulk licenses to a first distribution server 104 across a global network 106. More than one distribution servers by the same enterprise customer can receive bulk licenses directly from the web server system 102. The web server system 102 can be one or more instances of the computer system 700 of FIG. 7. For example the web server system 102 can include a licensing back-office server, a resource planner, an entitlement relationship management system, a customer portal, or any combination thereof.

The web server system 102 can be consider the root of trust in a distribution hierarchy 108 of license distribution nodes. The first distribution server 104 can be controlled by a customer of the publisher. The first distribution server 104 can be part of a local network. The first distribution server 104 can redistribute portions of the bulk licenses to one or more subsidiary distribution devices in the distribution hierarchy 108. For example, the subsidiary distribution devices can be first-level subsidiary distribution servers (e.g., a first-level subsidiary distribution server 110A and a first-level subsidiary distribution server 110B, collectively as "the first-level subsidiary distribution servers 110"). For another example, the subsidiary distribution devices can include one of end-user devices (e.g., an end-user device 112A) on the local network. The first distribution server 104 can maintain an accounting of all the bulk licenses.

The first distribution server 104 can deduct from the accounting whenever licenses are distributed to its subsidiary distribution devices, and increment from the accounting whenever licenses are freed up from the subsidiary distribution devices. Whenever one of the first-level subsidiary distribution servers 110 further distributes the portion of the bulk licenses it received from the first distribution server 104, that first-level subsidiary distribution server can report its accounting (e.g., how many licenses are distributed and to who) of its licenses back to the first distribution server 104 (i.e., the parent node of that first-level subsidiary distribution server).

The first-level subsidiary distribution servers 110 can also receive accounting reports from its subsidiary distribution servers (hereinafter "second-level subsidiary distribution servers 116"), such as the second-level subsidiary distribution server 116A and the second-level subsidiary distribution server 116B. In response, the first-level subsidiary distribution servers 110 can forward the accounting reports it receives from the second-level subsidiary distribution servers 116 to the first distribution server 104. Then, the first distribution server 104 can subsequently report its accounting and its subsidiaries' accountings to its parent in the distribution hierarchy 108. In this case, the first distribution server 104's parent in the distribution hierarchy 108 is the web server system 102 (i.e., the "root of trust"). In this manner, the root of trust can eventually acquire accountings of the licenses from every distribution point in the distribution hierarchy 108 and every distribution server can acquire accountings of the licenses from every distribution point flowing therefrom.

Such reporting backs and updates can occur in response to an action to change the accounting of each distribution point in the distribution hierarchy 108. The accounting of the licenses in each distribution point (e.g., distribution servers or end-user devices) can be stored in a trusted storage 118. For ease of illustration, the trusted storages 118 of the end-user devices 112 (e.g., the end-user device 112A, an end-user device 112B, and an end-user device 112C, collectively as "the end-user devices 112") are now shown in FIG. 1. For example, the accounting can be a series of fulfillment records ("FR") and deduction records ("DR") as exemplified in FIG. 1.

For example, the line "FR: 10 from 104" in the trusted storage 118 of the first-level subsidiary distribution server 110B denotes that the first-level subsidiary distribution server 110B received 10 licenses from the first distribution server 104. The line "DR: 1 to 112B" can denote the first-level subsidiary distribution server 110B having distributed a single license to an end-user device 112B. The line "DR: 9 to 116B" can denote the first-level subsidiary distribution server 110B having distributed 9 licenses to the second-level subsidiary distribution server 116B. The italicized line of "DR: 1 to 112C" can denote that the second-level subsidiary distribution server 116B has distributed one of its 9 licenses to the end-user device 112C.

Updates from a subsidiary distribution server is also part of the accounting. The end-user devices 112 can store its license(s) in an instance of the trusted storage 118. For example, the action can be a distribution of one or more licenses, a fulfillment of a license, a modification to issued functional features or capabilities granted by the license, or an update from a subsidiary distribution server.

Alternatively, the updates can be made in accordance with an update schedule. The update schedule can substitute reactionary updates when a network connection with a parent distribution server is not always available. In some embodiments, the updates of the accounting always follow the update schedule regardless of the network connection. The update schedule can be periodic or in accordance with other patterns. The update schedule can be modified by a command from a parent distribution server, such as a command to increase the frequency of the updates.

Every distribution server keeps a record of a supply chain ancestry 120 all the way back to the root of trust in the trusted storage 118. As illustrated, the supply chain ancestry 120 extends from a root of trust (illustrated as vertically striped circle) down to the current distribution server (illustrated as an empty circle). The distribution servers can also maintain a downstream distribution hierarchy 122 of distribution servers and/or end-user devices that possess one or more licenses that originated from the current distribution server.

Whenever a distribution server fails, a subsidiary device can report up to the next ancestor distribution server closest to the failed distribution server. Whenever a distribution server fails, a parent distribution server can also reconstitute the accounting of the licenses for the failed distribution server from either its trusted storage 118 or from trusted storage 118 of subsidiary devices of the failed distribution server. That is, all of the accounting records in the distribution hierarchy 108 in aggregate can account for every unit in the original inventory issued from the root of trust.

Here, a distribution supply chain is represented as the distribution hierarchy 108, where at the top of the distribution hierarchy 108 is the root of trust. The root of trust in this example is the web server system 102 of the publisher. The root of trust can be a computer system in a cloud computing environment. Each leaf node of the distribution hierarchy 108 can be a computing device of an enterprise or consumer user, where the computing device possesses one or more units of the digital inventory assets, such as a license to access a service or functionality via the computing device.

Each branch node of the distribution hierarchy 108 can be a channel partner server or a local distribution server. The branch node maintains an accounting of all inventory assets passing through it as well as all accounting records of any computing device that is a descendent of the branch node (i.e. having received digital inventory assets, e.g., licenses, from the branch node). All branch nodes and all leaf nodes each can store a supply chain ancestry 120 of its digital inventory assets. The supply chain ancestry 120 includes the branch or leaf node's parent node, the root of trust, and all distribution servers therebetween. The branch nodes and the leaf nodes can reside on one or more local networks connected to one or more network equipments (e.g., routers, switches, or any combination thereof). In some embodiments, communication with the root of trust requires a global network connection, such as an Internet connection. The branch nodes and/or leaf nodes can request and obtain digital inventory assets even when an Internet connection is not present to connect with the root of trust.

In order to ensure distribution within the multi-tier digital supply chain management system 100 is free from tampering, verification of the distributed licenses may be necessary. To achieve this, over a periodic interval, a licensing service (e.g., a thread in an activation application, a vendor daemon, or a license microkernel) within a distribution server or a licensee device can verify current accounting records (e.g., fulfillment records of unexpired and valid licenses) within its trusted storage 118 against a parent server in the supply chain ancestry 120. This verification can ensure the validity of the accounting records, as well as propagate additional information about the current status of each fulfillment record back to the parent server. For example, status update may include number of times a particular function or service is used and when the particular function or service is used. The status update may include an available usage of the fulfillment record if license associated with the fulfillment record dictates a limited number of usages.

A parent distribution server can verify accounting records of its subsidiary device against its own accounting records in its trusted storage 118. For example, the licensing service of the first distribution server 104 under the control of an enterprise customer can obtain batch licenses from the web server system 102. The first distribution server 104 can periodically request verification of its accounting records from the web server system 102 of the publisher.

The verification behavior of each device within the distribution hierarchy 108 can be configured by the web server system 102 of the publisher as part of its deployment settings for the enterprise customer controlling the first distribution server 104 and its subsidiaries. The timing of this verification process (periodicity/interval) can be defined by the publisher and can vary based on the sensitivity of the deployment. The web server system 102 can define policies governing the behavior of end-user devices and distribution servers (e.g., enforced by distribution manager microkernels or vendor daemons) when one or more of the licenses cannot be verified. Such policies can be propagated down through the distribution hierarchy 108. In some embodiments, the verification process can serve as a server heartbeat mechanism.

To further illustrate the disclosed architecture, the following example is disclosed as an illustration. The publisher can run the web server system 102 in San Francisco. The publisher can sell a hundred licenses of a product to an enterprise headquartered in New York. The enterprise can implement the first distribution server 104 in its headquarter in New York. The enterprise can also implement the first-level subsidiary distribution server 110A in Melbourne, Australia and the first-level subsidiary distribution server 110B in Tokyo, Japan. The first distribution server 104 can distribute and assign ten of the licenses to the first-level subsidiary distribution server 110A. The first-level subsidiary distribution server 110A can distribute a single license to the end-user device 112D (e.g., an application desktop of an end user) at the Melbourne office.

Under the disclosed verification process, the end-user device 112D can periodically verify the single license with the first-level subsidiary distribution server 110A. In time, the first-level subsidiary distribution server 110A can verify its ten licenses with the first distribution server 104. Further in time, the first distribution server 104 can verify its hundred licenses with the web server system 102.

Since the supply chain ancestry 120 of a fulfillment of license is maintained as part of the accounting records, each of the distribution servers in the distribution hierarchy 108 to implement an auto-correction license rights mechanism such that a complete failure of the end-user device 112D can be restored by the accounting records in the trusted storage 118 of the first-level subsidiary distribution server 110A. similarly, a complete failure of the first-level subsidiary distribution server 110A can be restored by the accounting records in the trusted storage 118 of the first distribution server 104. Alternatively, a complete failure of the first-level subsidiary distribution server 110A can be restored by the accounting records in the trusted storages 118 of the end-user device 112D and its siblings distribution points (e.g., distribution servers and end-user devices). Again similarly, a complete failure of the first distribution server 104 can be restored by the accounting records in the trusted storage 118 of the web server system 102. Alternatively, a complete failure of the first distribution server 104 can be restored by the accounting records in the trusted storages 118 of the first-level subsidiary distribution server 110A and its sibling distribution points.

Figure 2:
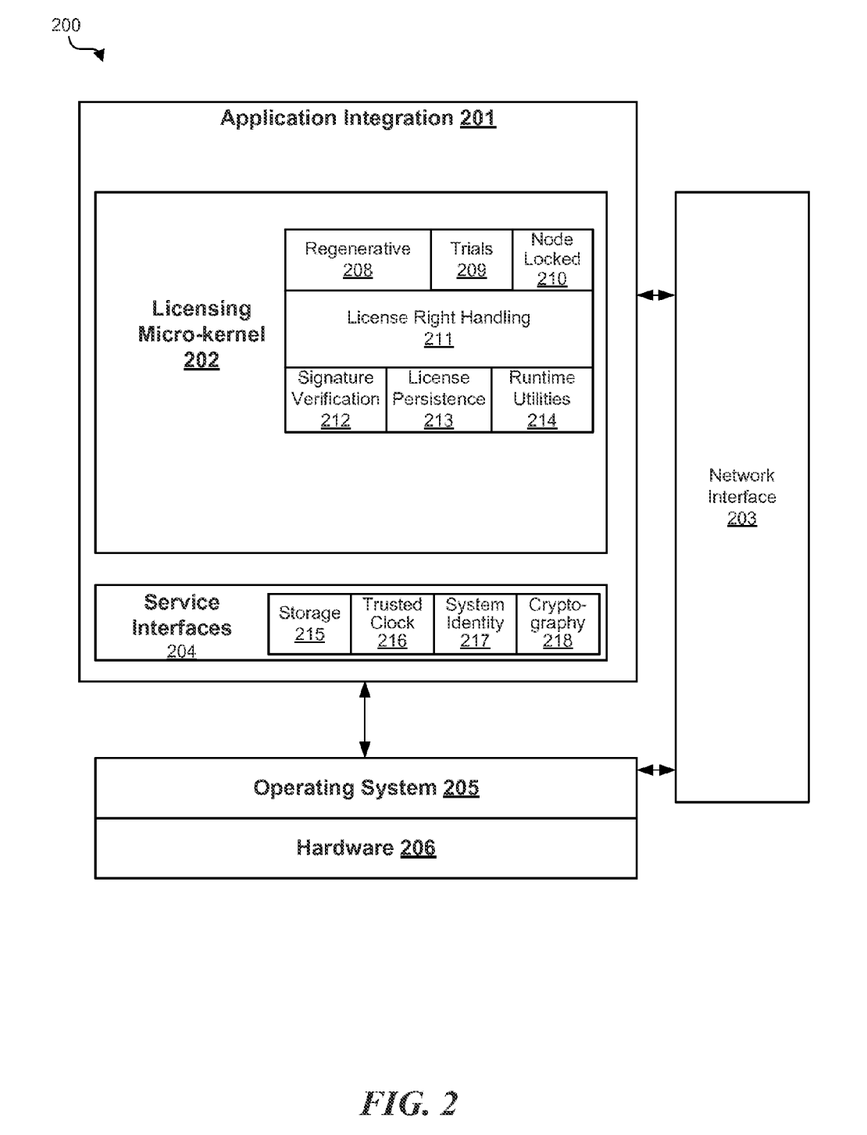
FIG. 2 is a block diagram illustrating an exemplary client device to enforce license rights, in accordance with various embodiments.

FIG. 2 is a block diagram illustrating an exemplary client device 200 to enforce license rights, in accordance with various embodiments. The client device 200 can implement an application integration module 201. The application integration module 201 may include a licensing micro-kernel 202 and service interfaces 204. The application integration module 201 can use hardware 206 (e.g., hardware components or capabilities) and an operating system 205 implemented on the client device 200.

Activation of a function or a capability on the client device 200 can involve a network interface 203 for communication between the client device 200 and a license server (e.g., one of the distribution servers in FIG. 1). In at least one embodiment, the licensing micro-kernel 202 is delivered by the provider as pre-built libraries, with services included that can be broken out as separate services, such as a signature verification module 212, a license persistence module 213, and runtime utility modules 214.

The signature verification module 212 is a logical module that verifies cryptographic signatures within a license (e.g., a feature line indicating that a particular function or capability is granted by the license). The signature verification module 212 assures the authenticity of the feature lines and prevents license tampering. The license persistence module 213 securely stores regenerative and trial license rights on the client device 200. Regenerative license rights are stored on the device so the capabilities are available in-between regenerations from the management server. Information about trial license rights stored on the client device 200 to ensure proper expiration. Runtime utility modules 214 represent wrappers around runtime functions, where the wrappers are used to provide encapsulation from various implementations of customizable operating systems calls.

In at least one embodiment, the licensing micro-kernel 202 handles license rights (e.g., via a license right handling module 211), and processes and maintains license rights of various models. Some supported license models may include a trial model 209, a regenerative model 208, and a node locked model 210. The trial model 209 includes license rights available for a specified duration of time. The regenerative model 208 specializes in the continuous license rights updates from a root of trust (e.g., directly from the root of trust or a distribution server granted the right to act as an agent of the root of trust) to the client device 200. The node locked model 210 specializes in the license rights locked to a given device or node.

The client device 200 can further include interfaces for a storage device 215, a trusted clock 216 (e.g., when time verification is part of a licensing condition), a system identity 217 (e.g., a unique device identifier), and cryptography module 218. The trusted clock 216 can provide an accurate system time to the licensing micro-kernel 202. This can help prevent unauthorized use of expired licenses. The storage device 215 can store license rights for the client device 200 including the accounting information and distribution hierarchy information associated with such license rights. That is, the storage device 215 can be the trusted storage of the client device 200. The cryptography module 218 can store cryptographic parameters in the storage device 215. For example, the client device 200 can receive cryptographic parameters (e.g., public keys) from a distribution server or the root of trust.

Figure 3:
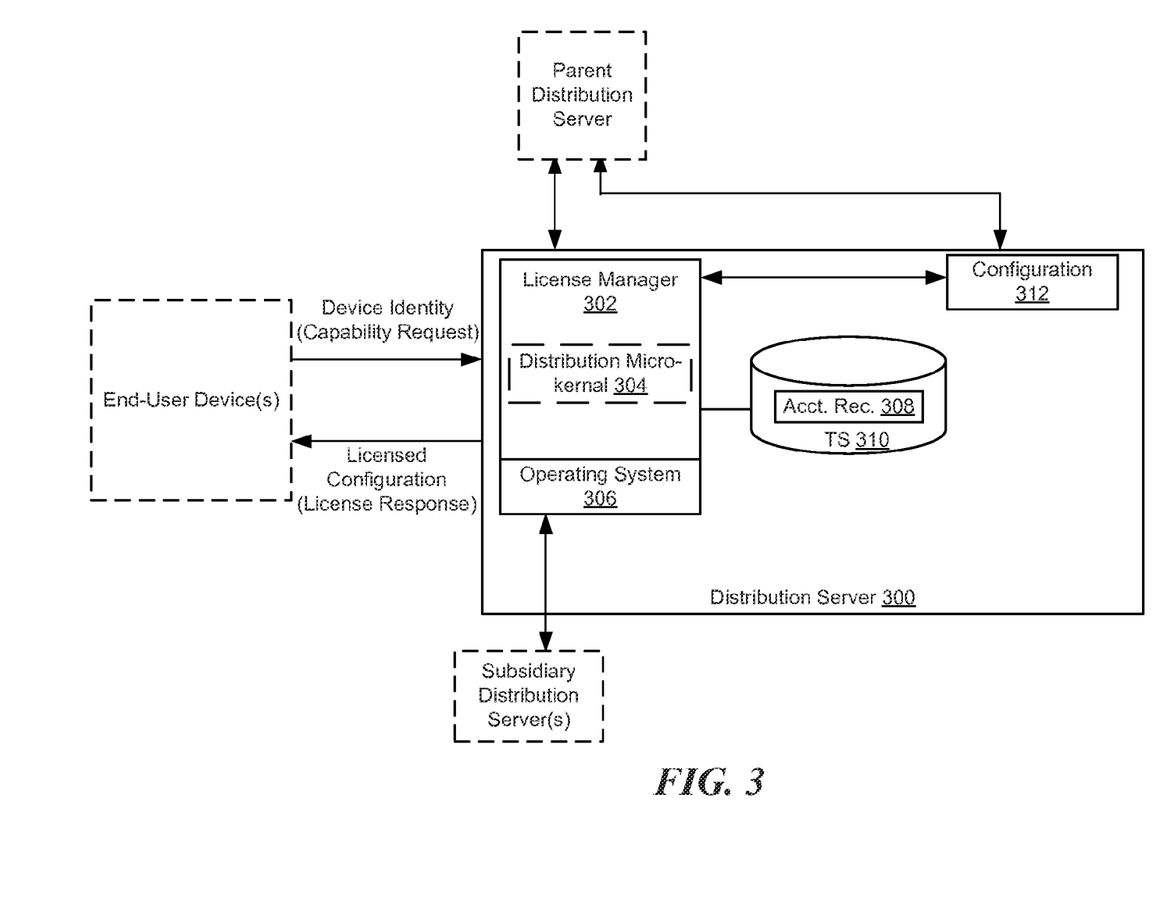
FIG. 3 is a block diagram illustrating an exemplary distribution server in a multi-tier digital supply chain management system, in accordance with various embodiments.

FIG. 3 is a block diagram illustrating an exemplary distribution server 300 in a multi-tier digital supply chain management system (e.g., the multi-tier digital supply chain management system 100 of FIG. 1), in accordance with various embodiments.

The distribution server 300 includes a license manager 302, a distribution micro-kernel 304, and an operating system (OS) 306. The license manager 302 and the distribution micro-kernel 304 handle license rights. The distribution server 300 stores an accounting records 308 in a trusted storage 310. A parent distribution server can communicate a bulk license message including licenses to be served to the distribution server 300. The licenses and the accounting records 308 of the licenses can be stored in the trusted storage 310. The parent distribution server can further communicate a configuration message to a configuration module 312 on the distribution server 300. For example, the configuration message can indicate the frequency of propagating back updates of the trusted storage 310 and the frequency of license verification with the parent distribution server.

Regarding FIG. 2 and FIG. 3, portions of components and/or modules described therein may each be implemented in the form of special-purpose circuitry, or in the form of one or more appropriately programmed processors, or a combination thereof. For example, the modules described can be implemented as instructions on a tangible storage memory capable of being executed by a processor or a controller in the control circuitry. The tangible storage memory may be volatile or non-volatile memory. In some embodiments, the volatile memory may be considered "non-transitory" in the sense that it is not transitory signal. Modules may be operable when executed by a processor or other computing device, e.g., a single board chip, application specific integrated circuit, a field programmable field array, a network capable computing device, a virtual machine terminal device, a cloud-based computing terminal device, or any combination thereof. Memory space and storages described in the figures can be implemented with the tangible storage memory as well, including volatile or non-volatile memory.

Each of the modules and/or components may operate individually and independently of other modules or components. Some or all of the modules may be executed on the same host device or on separate devices. The separate devices can be coupled together through one or more communication channels (e.g., wireless or wired channel) to coordinate their operations. Some or all of the components and/or modules may be combined as one component or module.

A single component or module may be divided into sub-modules or sub-components, each sub-module or sub-component performing separate method step or method steps of the single module or component. In some embodiments, at least some of the modules and/or components share access to a memory space. For example, one module or component may access data accessed by or transformed by another module or component. The modules or components may be considered "coupled" to one another if they share a physical connection or a virtual connection, directly or indirectly, allowing data accessed or modified from one module or component to be accessed in another module or component. In some embodiments, at least some of the modules can be upgraded or modified remotely. The client device 200 and the distribution server 300 may include additional, fewer, or different modules for various applications.

Figure 4:
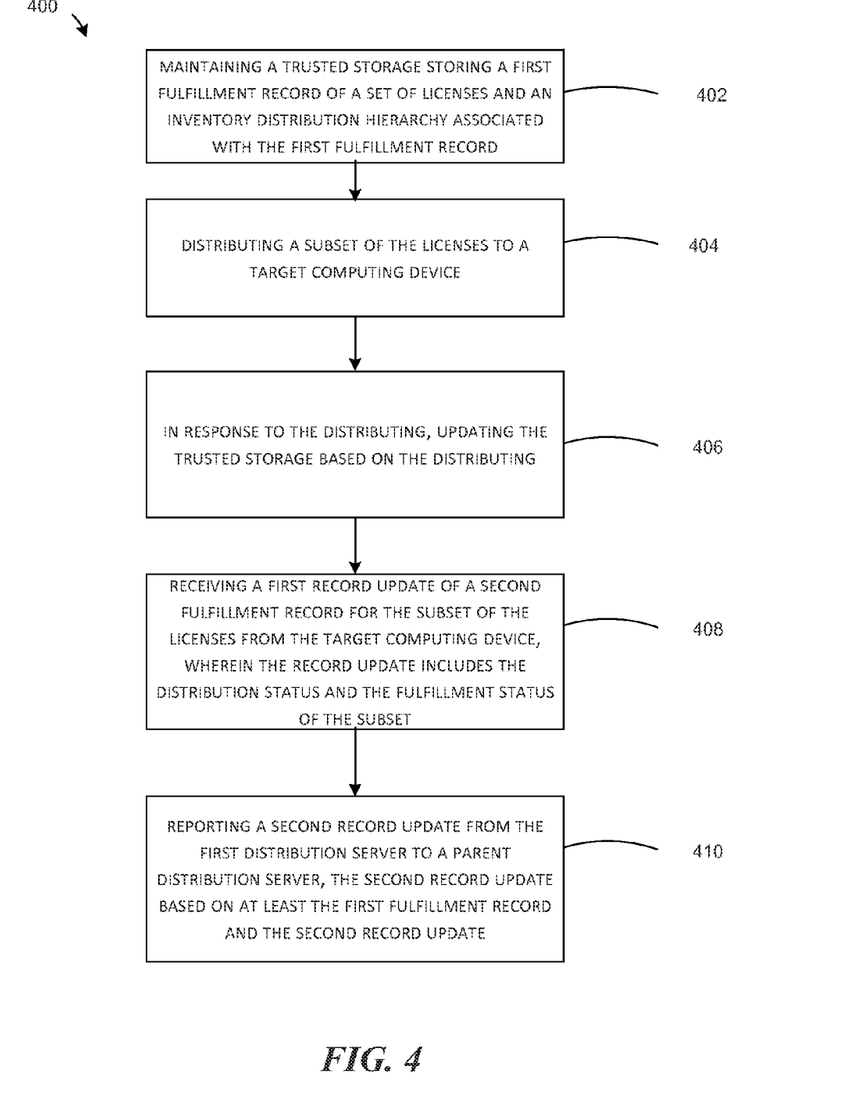
FIG. 4 is a flow chart illustrating a process of synchronizing inventory records across a hierarchy of record management nodes, in accordance with various embodiments.

FIG. 4 is a flow chart illustrating a process 400 of synchronizing inventory records across a hierarchy of record management nodes, in accordance with various embodiments. The process can be executed on any one of the record management nodes, such as one of the distribution servers of the distribution hierarchy 108 of FIG. 1 or the distribution server 300 of FIG. 3. For example, the process can be executed by a first distribution server of licenses. The hierarchy of record management nodes can all report to a root of trust, such as a software license vendor.

The process 400 can begin with the first distribution server maintaining a trusted storage storing a first fulfillment record of a set of licenses and a distribution hierarchy associated with the first fulfillment record at step 402. The first fulfillment record can indicate distribution statuses of the licenses. For example, the first fulfillment record can include a record of available licenses (i.e., licenses that have yet to be redistributed), unfulfilled licenses that have been redistributed, fulfilled licenses that have been redistributed, or any combination thereof "Distribution" herein refers to the grant of management accountability and transfer of available licenses to another distribution server in which the first distribution server is held accountable for. "Fulfillment" herein refers to a process of binding a license to an end-user device to enable the end-user device to enjoy the benefit of a device functionality (e.g., software function, hardware function, web service function, etc.). A "fulfillment record" can refer to accounting records of license fulfillments (e.g. an indication of which device is an end-user device that activated at least one of the licenses and what capability or function is granted by the at least one of the licenses) and license distributions.

The distribution hierarchy can include a supply chain indicating one or more devices that transferred the set of the licenses from a root of trust for the licenses to the first distribution server. The distribution hierarchy can also include a downstream distribution hierarchy indicating one or more devices that directly or indirectly receives one or more licenses from the first distribution server.

The first distribution server could have received the set of licenses in bulk from a parent distribution server. The parent distribution server can be a distribution server at the root of trust or a local distribution server. In response to receiving the licenses in bulk, the first distribution server can update the parent distribution server as a parent node in the supply chain of the distribution hierarchy and update the first fulfillment record to include the set of the licenses.

When the trusted storage includes available licenses, the first distribution server can distribute, at step 404, a subset of the licenses to a target computing device. In response to the distribution of the subset, the first distribution server updates, at step 406, the trusted storage based on the distribution of the subset. For example, the first distribution server can update the distribution statuses of the licenses. For example, the distribution statuses can be represented by a deduction record of the subset. As another example, the first distribution server can also update the distribution hierarchy by including the target computing device as a child node of itself in the downstream distribution hierarchy. In subsequent steps, based on feedback messages from the target computing device, the first distribution server can further update identities of any descendent nodes from the target computing device.

Distribution of the subset of the licenses can include distributing a public signature key associated with the first distribution server. Subsequently, the target computing device can periodically send a validation request to the first distribution server to validate the subset of the licenses. When the first distribution server receives the validation request, the first distribution server can validate the subset by responding with a cryptographic signature generated from a private signature key corresponding to the public signature key. The cryptographic signature is verifiable on the target computing device with the public signature key. The public signature key and/or the cryptographic signature can be cryptographically layered (e.g., key wrapped). That is, the cryptographic signature can include cryptographic signatures that respectively correspond to distribution servers along the supply chain. However, the subset of licenses can be verify with only the outermost layer of the cryptographic signatures corresponding to a parent node in the distribution hierarchy.

The first distribution server can, at some point, receive a first record update of a second fulfillment record for the subset of the licenses from the target computing device at step 408. The second fulfillment record can indicate fulfillment and/or distribution of at least some of the subset of the licenses. For example, the second fulfillment record can be in response to the target computing device distributing the subset of the licenses further to other distribution servers and/or end-user devices. The second fulfillment record can include information in its own trusted storage and the trust storages of the other distribution servers under its management. The first record update can update the first fulfillment record to be consistent with the second fulfillment record.

The first record update can include receiving a descendent distribution hierarchy from the target computing device including one or more identifiers for one or more downstream distribution nodes from the target computing device. Each of the downstream distribution nodes would have received at least one of the subset of the licenses.

The first distribution server can report, at step 410, a second record update from the first distribution server to the parent distribution server. The second record update can be reported periodically. The parent distribution server can issue a command to adjust the frequency of the periodic reports. Alternatively, the second record update can be made in response to any updates from the first distribution server's child nodes, such as from the target computing device. The second record update can include updates to the distribution hierarchy and/or the fulfillment records.

Figure 5:
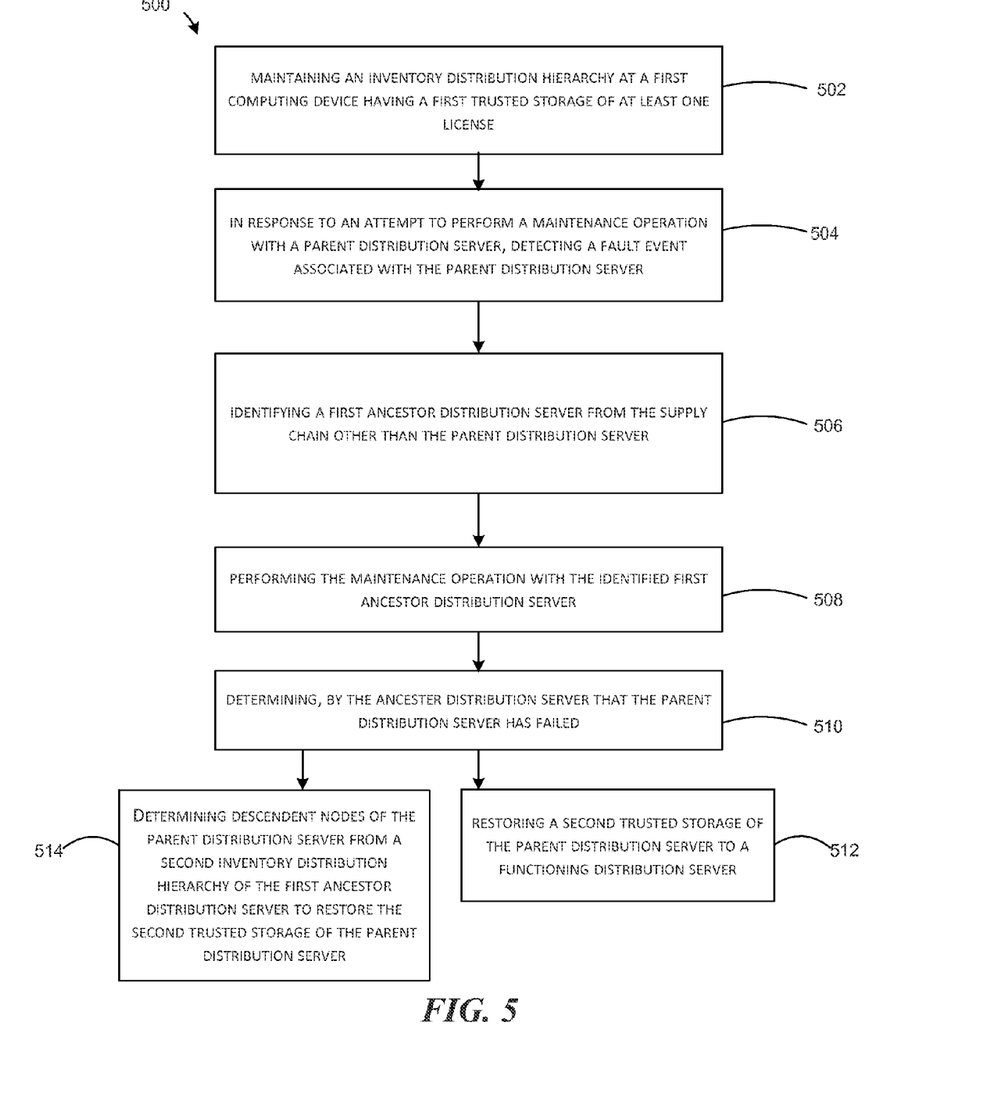
FIG. 5 is a flow chart illustrating a process of recovering from a record management node failure, in accordance with various embodiments.

FIG. 5 is a flow chart illustrating a process 500 of recovering from a record management node failure, in accordance with various embodiments. For example, the record management node can be a license distribution server in a digital supply chain management system, such as the multi-tier digital supply chain management system 100 of FIG. 1. The process 500 includes a step 502 of maintaining a distribution hierarchy at a first computing device having a first trusted storage of at least one license. The distribution hierarchy can include a supply chain indicating one or more devices that transferred the license from a root of trust in the digital supply chain management system to the first computing device.

In response to an attempt to perform a maintenance operation with a parent distribution server, the first computing device can detect, at step 504, a fault event associated with the parent distribution server. Subsequently, the first computing device can identify a first ancestor distribution server from the supply chain other than the parent distribution server at step 506. The first computing device can then perform the maintenance operation with the identified first ancestor distribution server at step 508.

For example, the maintenance operation can be a periodic validation of the license or a record update (e.g., fulfillment record update) relating to the license. The first ancestor distribution server can be an operational server within the supply chain that is closest in link to the parent distribution server, such as a "grand-parent" distribution server.

At step 510, the first ancestor distribution server determine that the parent distribution server has failed. Step 510 can be based on a reporting from the first computing device or any other distribution server in the supply chain. Step 510 can also be based on the parent distribution server's failure to report in to the first ancestor distribution server. At step 512, the first ancestor distribution server can restore a second trusted storage of the parent distribution server to a functioning distribution server based at least partly on a third trusted storage of the first ancestor distribution server.

Alternatively, the first ancestor distribution server can determine, at step 514, descendent nodes of the parent distribution server from a second inventory distribution hierarchy of the first ancestor distribution server to restore the second trusted storage of the parent distribution server to a functioning distribution server by trusted storages of the descendent nodes.

Figure 6:
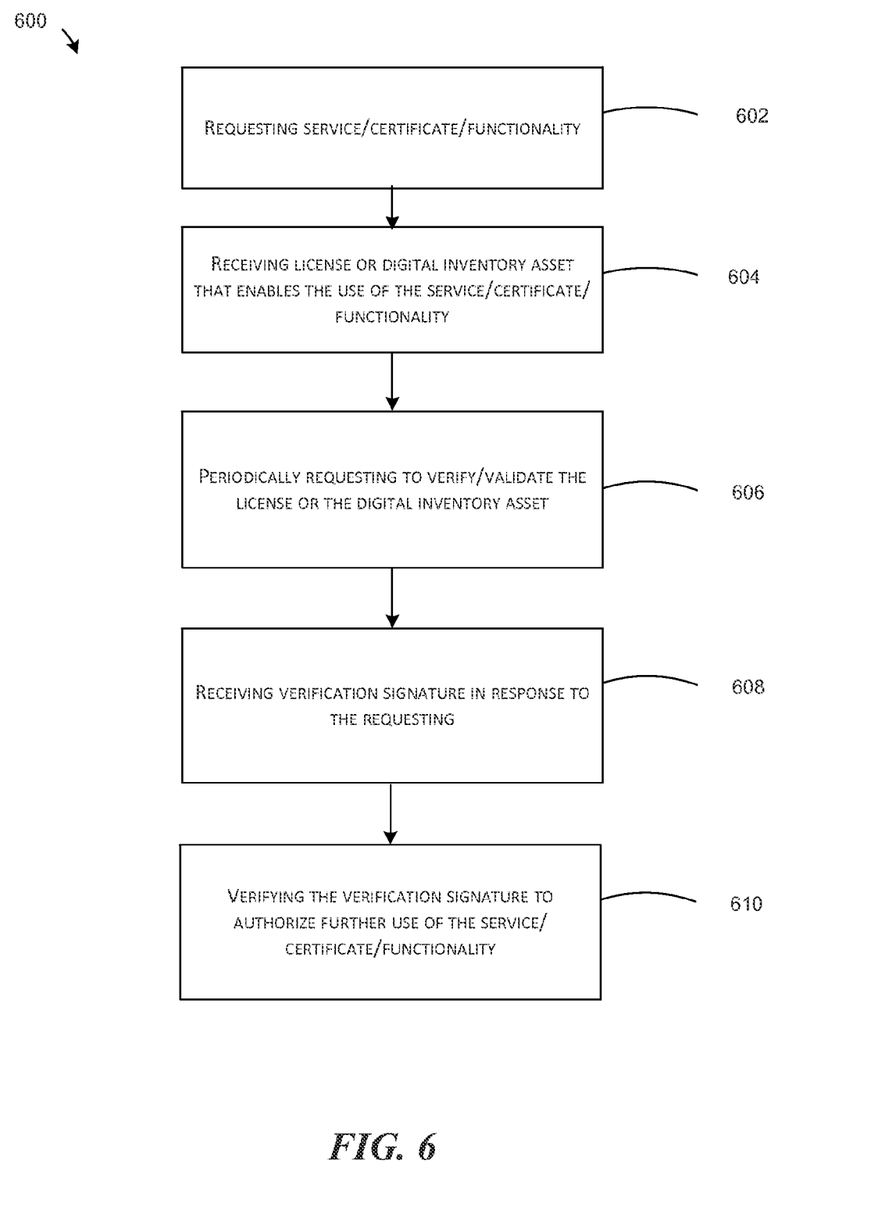
FIG. 6 is a flow chart of a process for an end-user device to acquire a license through a digital rights management system, in accordance with various embodiments.

FIG. 6 is a flow chart of a process 600 for a device to acquire a license through a digital rights management system, in accordance with various embodiments. The process 600 includes the device requesting a service, a certificate, or a functionality at step 602. In response, a first license distribution server can send a license or other types of digital inventory asset to the device. Hence, in step 604, the device receives the license or the digital inventory asset. The license or digital inventory asset can be used to gain access to the service, certificate, or functionality requested in step 602.

A microkernel in the device can periodically request for the validation or verification of the license or the digital inventory asset in step 606. In response, the first license distribution server that distributed or issued the license or digital inventory asset can send a verification signature to validate and verify the license or the digital inventory asset. Alternatively, any license distribution server in a digital supply chain that delivered the license or the digital inventory asset to the first license distribution server can send a verification signature to validate and verify the license or the digital inventory asset. Hence, in step 608, the device receives the verification signature in response to the requesting. The microkernel in the device can verify the verification signature and hence authorize further use of the service, certificate, or functionality protected by the microkernel in step 610.

While processes or blocks are presented in a given order in FIG. 5, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 7:
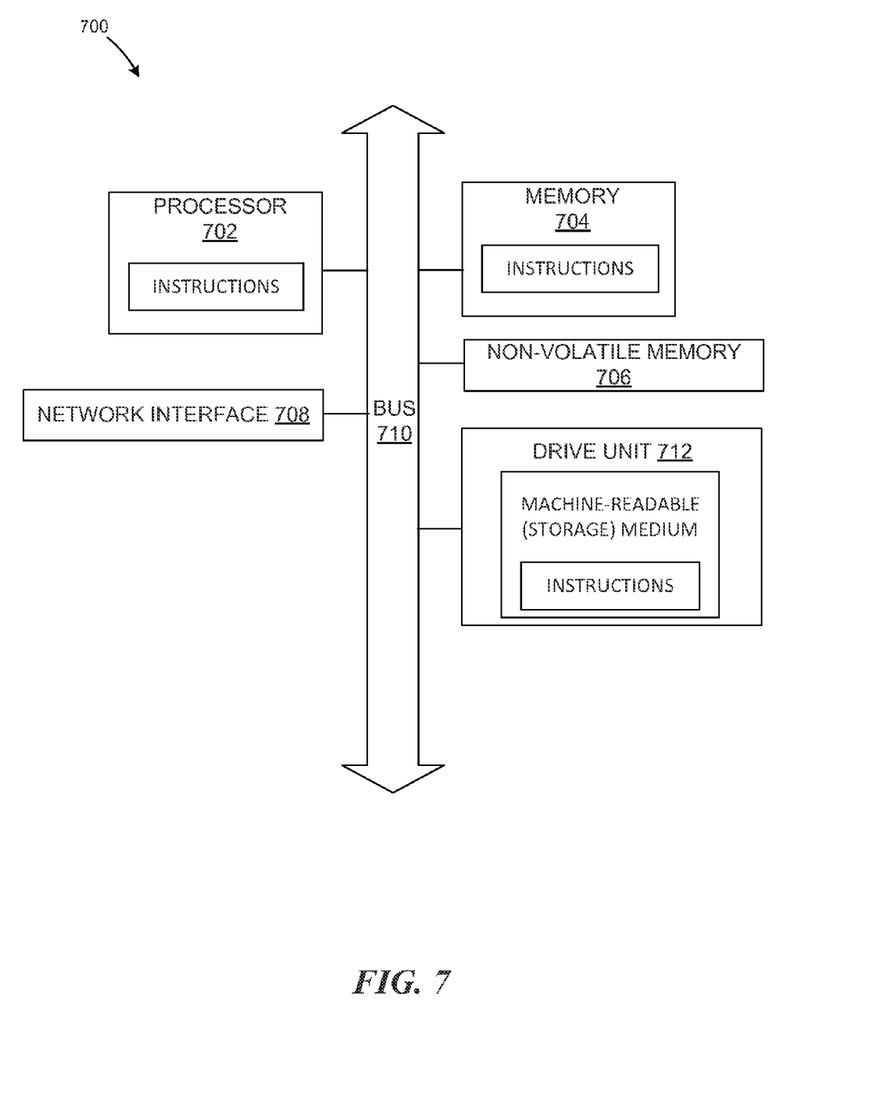
FIG. 7 is a diagrammatic representation of a machine in the example form of a computer system within which a set of instructions, for causing the machine to perform any one or more of the methodologies or modules discussed herein, may be executed.

FIG. 7 is a block schematic diagram that depicts a machine in the exemplary form of a computer system 700, within which a set of instructions for causing the machine to perform any of the herein disclosed methodologies (e.g., FIGS. 4-6) may be executed. For example, the computer system 700 can implement the client device 200 of FIG. 2 or the distribution server 300 of FIG. 3. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken. The computer system 700 is intended to illustrate a hardware device on which any of the instructions, processes, modules and components depicted in the figures above (and any other processes, techniques, modules and/or components described in this specification) can be implemented. As shown, the computer system 700 includes a processor 702, memory 704, non-volatile memory 706, and a network interface 708. Various common components (e.g., cache memory) are omitted for illustrative simplicity. The computer system 700 can be of any applicable known or convenient type, e.g., a personal computer (PC), server-class computer or mobile device (e.g., smartphone, card reader, tablet computer, etc.). The components of the computer system 700 can be coupled together via a bus and/or through any other known or convenient form of interconnect.

One of ordinary skill in the relevant art will recognize that the terms "machine-readable (storage) medium" or "computer-readable (storage) medium" include any type of device that is accessible by the processor 702. The memory 704 is coupled to the processor 702 by, for example, a bus 710. The memory 704 can include, by way of example but not limitation, random access memory (RAM), e.g., dynamic RAM (DRAM) and static RAM (SRAM). The memory 704 can be local, remote, or distributed.

The bus 710 also couples the processor 702 to the non-volatile memory 706 and drive unit 712. The non-volatile memory 706 may be a hard disk, a magnetic-optical disk, an optical disk, a read-only memory (ROM), e.g., a CD-ROM, Erasable Programmable Read-Only Memory (EPROM), or Electrically Erasable Programmable Read-Only Memory (EEPROM), a magnetic or optical card, or another form of storage for large amounts of data. The non-volatile memory 706 can be local, remote, or distributed.

The data structures, modules, and instruction steps described in the figures above may be stored in the non-volatile memory 706, the drive unit 712, or the memory 704. The processor 702 may execute one or more of the modules stored in the memory components.

The bus 710 also couples the processor 702 to the network interface 708. The network interface 708 can include one or more of a modem or network interface. A modem or network interface can be considered to be part of the computer system 700. The network interface 708 can include an analog modem, ISDN modem, cable modem, token ring interface, satellite transmission interface (e.g. "direct PC"), or other interfaces for coupling a computer system to other computer systems.

It is to be understood that embodiments may be used as or to support software programs or software modules executed upon some form of processing core (e.g., the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Some embodiments of the disclosure have other aspects, elements, features, and steps in addition to or in place of what is described above. These potential additions and replacements are described throughout the rest of the specification. For example, some embodiments involve a computer server in a digital supply chain management system. The computer server can include: a network device adapted to communicate with at least a local network and an external global network; a trusted storage configured to store a set of licenses, fulfillment records of the set of the licenses, and a distribution hierarchy associated with the set of the licenses; and a processor configured by executable instructions to implement a vendor daemon to request verification of the set of the licenses with a trusted authority over the external global network or with a parent distribution server over the local network. The processor can be further configured to distribute at least a subset of the licenses to one or more recipient computing devices over the local network. The distribution hierarchy can include a supply chain that indicates computing servers accountable for sourcing the set of the licenses. The supply chain can include the parent distribution server and the trusted authority. The distribution hierarchy can also include a descendent hierarchy indicative of descendent computing devices that directly or indirectly received the subset of the licenses. The descendent computing devices can include the recipient computing devices.

What is claimed is:

1. A method of managing a bulk package of licenses at a first distribution server, the method comprising:

maintaining, by the first distribution server, a trusted storage storing a first fulfillment record of a set of licenses and a distribution hierarchy for the set of licenses, wherein the first fulfillment record indicates distribution statuses of the set of licenses and wherein the distribution hierarchy includes a supply chain indicating one or more devices that transferred the set of licenses from a root of trust, for the set of licenses, to the first distribution server, wherein the root of trust is separate from the first distribution server;

distributing, at the first distribution server, a subset of the set of licenses to a target computing device, wherein the target computing device is a subsidiary distribution server to the first distribution server;

in response to the distributing, updating, by the first distribution server, the trusted storage, including the distribution hierarchy, based on the distributing, wherein the distribution hierarchy includes identifiers for one or more downstream distribution nodes that include at least the subsidiary distribution server and one or more upstream distribution nodes that include the root of trust, each downstream and upstream distribution node having its own trusted storage storing the distribution hierarchy and fulfillment records of at least a subset of licenses directly or indirectly from the root of trust;

receiving, at the first distribution server and from the target computing device, a first record update of a second fulfillment record for the subset of the set of licenses;

updating the first fulfillment record to be consistent with the second fulfillment record based on the first record update; and sending a second record update, based on the updated first fulfillment record, up the supply chain to update the fulfillment records of each upstream distribution node up to and including the root of trust.

2. The method of claim 1, further comprising:

receiving, at the first distribution server, the set of licenses in bulk from a parent distribution server;

in response to the receiving, updating the parent distribution server as a parent node in the supply chain of the distribution hierarchy; and updating the first fulfillment record to include the set of licenses.

3. The method of claim 2, wherein the parent distribution server is either the root of trust connected to the first distribution server via a global network or a local distribution server connected to the first distribution server via a local network.

4. The method of claim 1, wherein updating the trusted storage based on the distributing includes updating the distribution hierarchy to include the target computing device as a child node from the first distribution server.

5. The method of claim 1, wherein updating the trusted storage includes updating the distribution statuses of the subset in the first fulfillment record.

6. The method of claim 1, wherein receiving the first record update includes receiving a descendent distribution hierarchy from the target computing device including one or more identifiers for one or more downstream nodes from the target computing device, wherein each downstream node has received at least one license from the subset of the set of licenses.

7. The method of claim 1, wherein sending the second record update includes sending the second record update from the first distribution server to a parent distribution server, the second record update based at least in part on the first fulfillment record including the first record update.

8. The method of claim 7, wherein the sending of the second record update is in response to meeting a periodic update schedule for updating changes to the first fulfillment record and the distribution hierarchy to the parent distribution server.

9. The method of claim 8, further comprising adjusting a frequency of the periodic update schedule in response to receiving a command from the parent distribution server.

10. The method of claim 7, wherein the sending of the second record update is in response to receiving the first record update from the target computing device.

11. The method of claim 1, wherein distributing the subset of the set of licenses includes distributing a public signature key associated with the first distribution server.

12. The method of claim 11, further comprising:
receiving a validation request from the target computing device to validate the subset of the set of licenses; and
validating the subset of the set of licenses by responding with a cryptographic signature generated from a private signature key corresponding to the public signature key, wherein the cryptographic signature is verifiable on the target computing device with the public signature key.

13. The method of claim 12, wherein the cryptographic signature includes layered cryptographic signatures that respectively correspond to distribution servers along the supply chain.

14. The method of claim 1, wherein the first fulfillment record includes an indication of which device is an end user of at least one of the licenses and what capability or function is granted by the at least one of the licenses.

15. The method of claim 1, wherein the target computing device is either an end-user device that activates one of the licenses or a local distribution server.

16. A computer server in a digital supply chain management system downstream from and separate from a root of trust, the computer server comprising:
a network device adapted to communicate with at least a local network and an external global network;
a trusted storage configured to store a set of licenses, a first fulfillment record of the set of licenses, and a distribution hierarchy associated with the set of licenses, wherein the first fulfillment record indicates distribution statuses of the licenses; and
a processor configured by executable instructions to implement a vendor daemon to request verification of set of the licenses with the root of trust over the external global network or with a parent distribution server over the local network, wherein the computer server is a subsidiary distribution server to the parent distribution server and is configured to receive at least part of the set of licenses from the parent distribution server;
wherein the processor is further configured to distribute at least a subset of the set the licenses to one or more subsidiary distribution servers over the local network;
wherein the distribution hierarchy includes a supply chain that indicates one or more upstream distribution servers accountable for sourcing the set of licenses, the supply chain including the parent distribution server and the root of trust;
wherein the distribution hierarchy includes a descendent hierarchy indicative of one or more downstream distribution servers that directly or indirectly received the subset of the set of licenses, the downstream distribution servers including the subsidiary distribution server;
wherein the processor is further configured to, in response to distribution of the at least the subset of the set of licenses, update the distribution hierarchy based on said distributing, each upstream distribution server and downstream distribution server having its own trusted storage storing the distribution hierarchy and fulfillment records of at least a subset of licenses directly or indirectly from the root of trust;
wherein the processor is further configured to:
receive a first record update of a second fulfillment record for the subset of the set of licenses from one of the subsidiary distribution servers;
update the first fulfillment record to be consistent with the second fulfillment record based on the first record update; and
send a second record update, based on the updated first fulfillment record, up the supply chain to update the fulfillment records of each upstream distribution server up to and including the root of trust.

17. The computer server of claim 16, wherein the distribution hierarchy includes identifiers for the one or more downstream distribution servers and the one or more upstream distribution servers that include the root of trust and the parent distribution server.

18. A method of managing a bulk package of licenses at a first distribution server downstream from a root of trust server system responsible for final verification of the licenses, the method comprising:
storing, by the first distribution server and in a trusted storage, a first fulfillment record of a set of licenses and a distribution hierarchy for the set of licenses, wherein the first fulfillment record indicates distribution statuses of the licenses and wherein the distribution hierarchy includes a supply chain indicating one or more devices that transferred the set of licenses from the root of trust server system for the licenses to the first distribution server, wherein the root of trust server system is separate from the first distribution server;
verifying the set of licenses with the root of trust server system;
distributing, at the first distribution server, a subset of the set of licenses to a subsidiary distribution server;
in response to the distributing, updating, by the first distribution server, the distribution hierarchy in the trusted storage based on the distributing, wherein the distribution hierarchy includes identifiers for one or more downstream distribution nodes that include at least the subsidiary distribution server and one or more upstream distribution nodes that include the root of trust server system, each of the downstream and upstream distribution nodes having its own trusted storage storing the distribution hierarchy and fulfillment records of at least a subset of licenses directly or indirectly from the root of trust server system;

receiving, at the first distribution server, a record update of a second fulfillment record for at least part of the subset of the set of licenses from the subsidiary distribution server;

updating the first fulfillment record to be consistent with the second fulfillment record based on the record update such that the first fulfillment record is available to reconstitute records of another distribution server in the distribution hierarchy during a fault event; and sending a second record update, based on the updated first fulfillment record, up the supply chain to update the fulfillment records of each upstream distribution node up to and including the root of trust server system.

\* \* \* \* \*